(No Model.) 4 Sheets—Sheet 2.
C. PAYEN.
PROCESS OF PRODUCING CRYSTALLIZED LEAD PLATES.
No. 440,269. Patented Nov. 11, 1890.
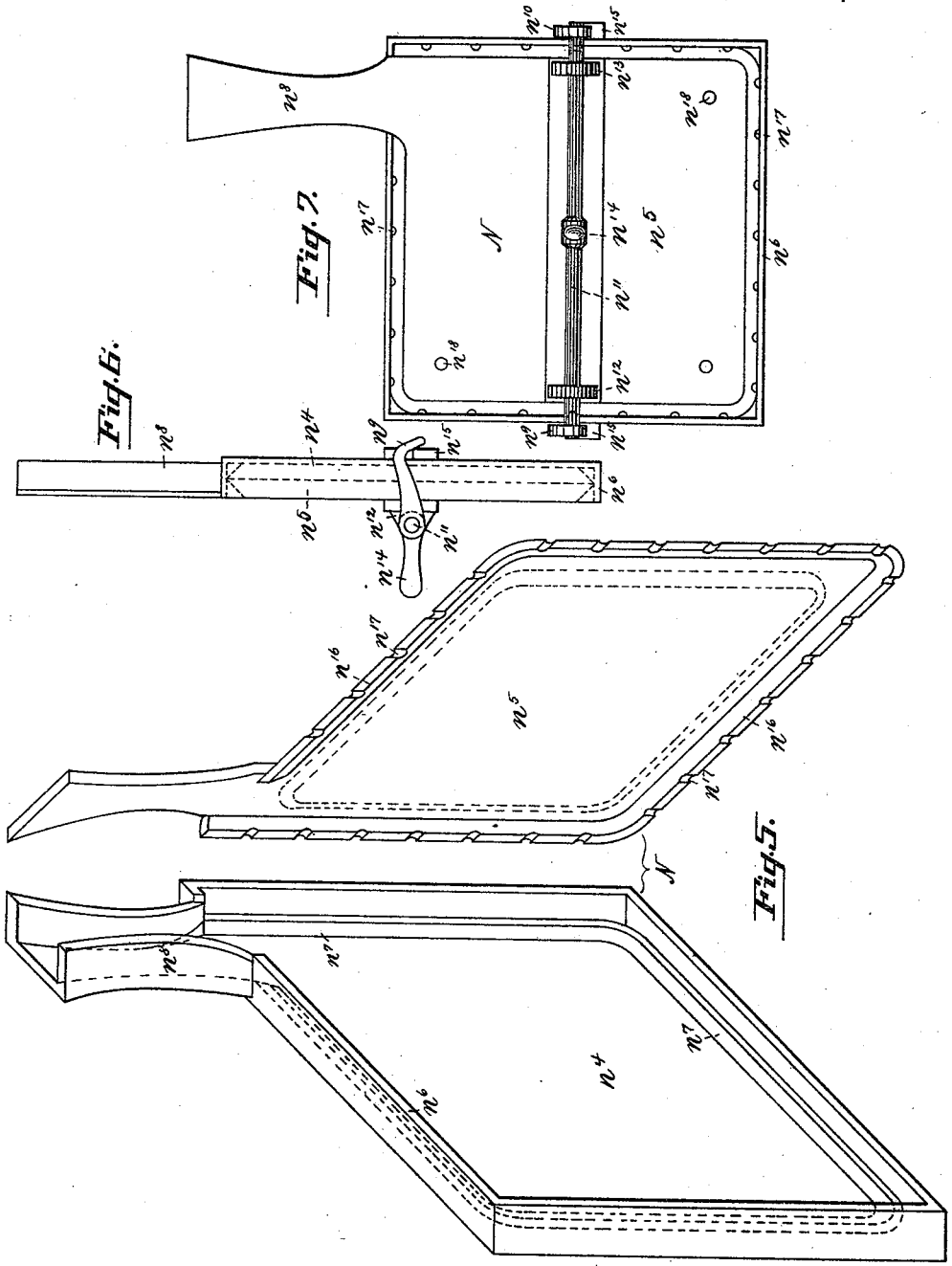

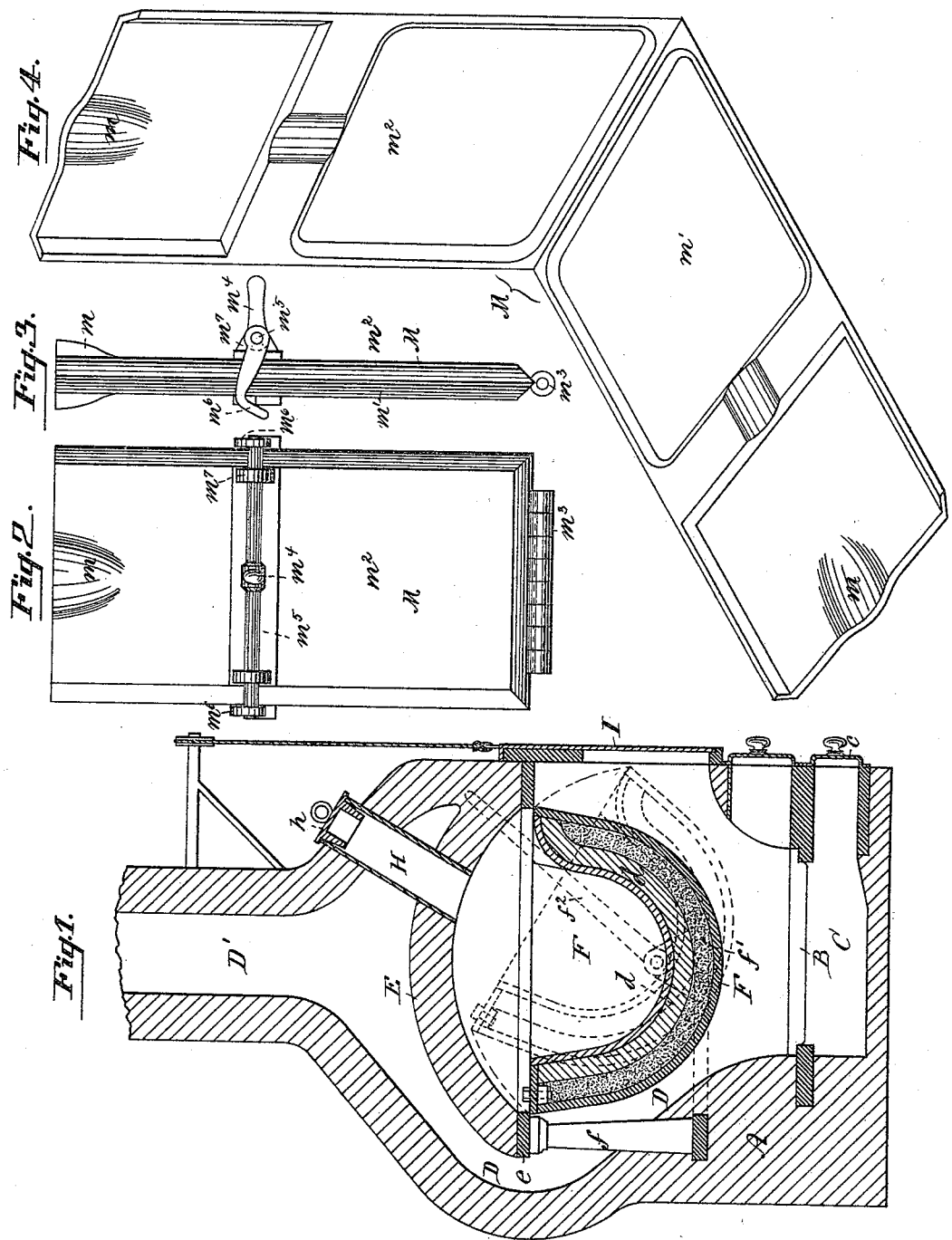

(No Model.) 4 Sheets—Sheet 3.
C. PAYEN.
PROCESS OF PRODUCING CRYSTALLIZED LEAD PLATES.
No. 440,269. Patented Nov. 11, 1890.
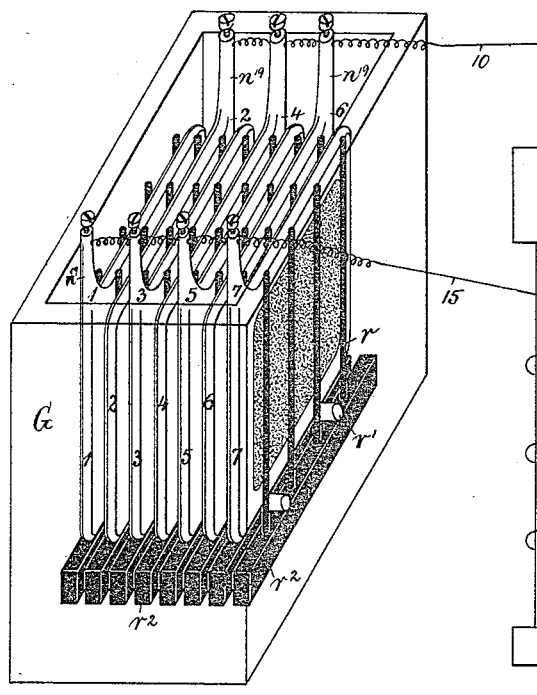
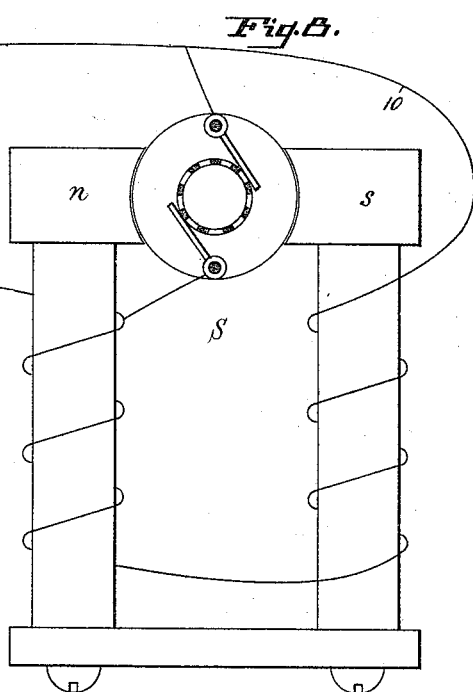
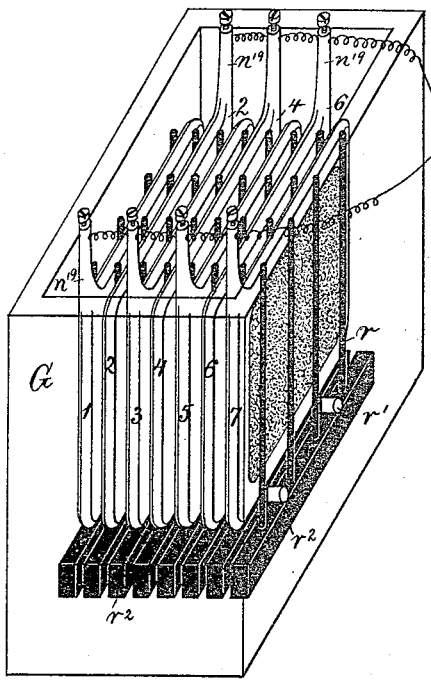
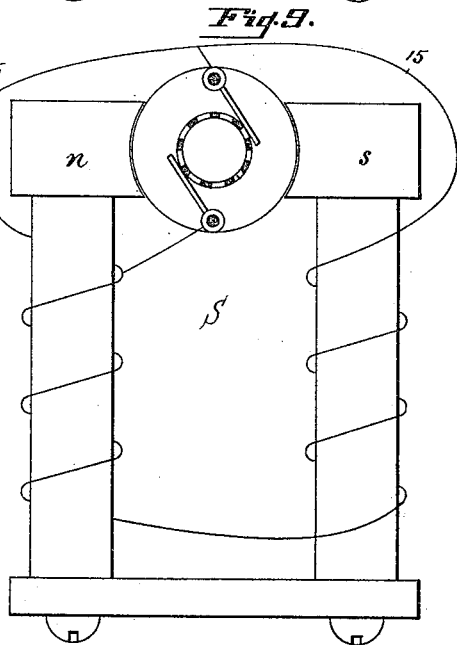
WITNESSES:
Hermann Bornmann.
Thomas M. Smith.
INVENTOR:
Clement Payen,
By J. Walter Douglass.
Atty

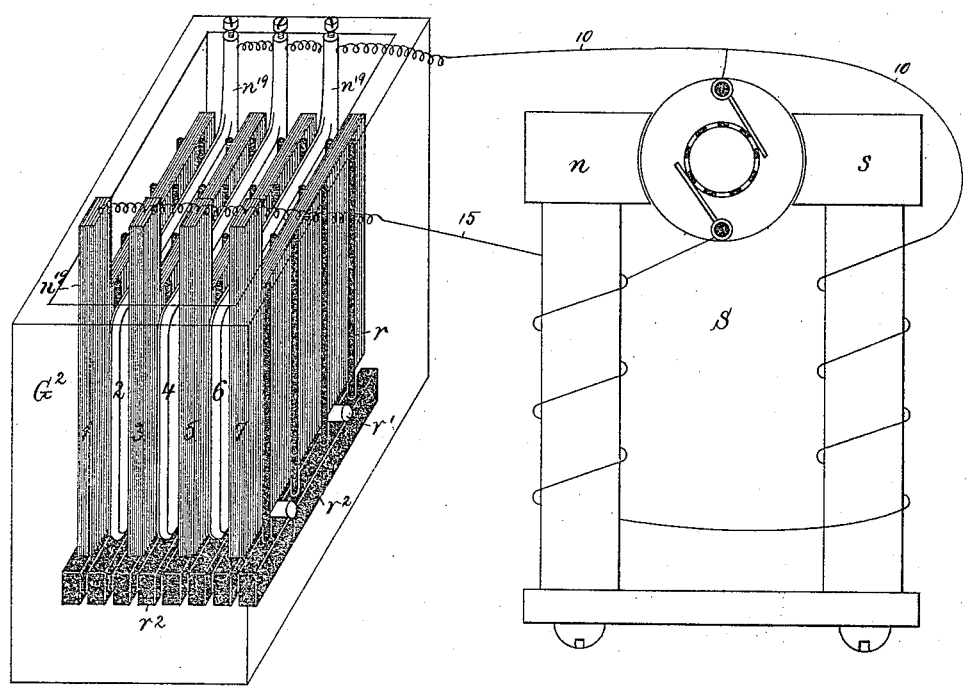

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

PROCESS OF PRODUCING CRYSTALLIZED LEAD PLATES.

SPECIFICATION forming part of Letters Patent No. 440,269, dated November 11, 1890.

Application filed January 23, 1888. Serial No. 261,616. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in the Process of Producing Crystallized Lead Plates, of which the following is a specification.

My invention relates to the production of porous crystallized metal lead plates.

The principal object of my invention is to provide a strong porous crystallized metal plate for use as an element of a secondary battery.

My invention consists in fusing with a salt of lead and ammonium salt or salts, then discharging the mass into a mold wherein in cooling it becomes crystallized, and then reducing the cast structure to a metallic state, whereby a strong porous crystallized metal lead plate will be produced freed from foreign impurities that the same may contain, and especially adapted for use as an element of a storage-battery.

In the accompanying drawings I have illustrated apparatus for the conduct of my method for producing crystallized plates, and in such forms, respectively, as I have found practically efficient, and in which—

Figure 1 is a vertical central section through a melting or fusing furnace of my improved construction, showing the crucible pivotally supported therein and operated by a lever for discharging the contents thereof. Fig. 2 is a top or plan view of my improved mold made in two sections hinged to each other and showing also the means for clamping the same together. Fig. 3 is an end view of said mold. Fig. 4 is a perspective view of said mold made in two sections hinged to each other and showing also the interior formation of the same. Fig. 5 is a perspective view of the bivalved mold for framing the crystallized metallic plates. Fig. 6 is an end view of said framing-mold clamped together. Fig. 7 is a top or plan view of said framing-mold and showing also the clamping device thereof. Figs. 8 and 9 are respectively diagrammatic views showing canisters with the crystallized plates therein insulated from each other and from the canisters and the respective plates connected by means of wires with dynamos, and which views illustrate the two-part single electrolytic action to which said crystallized chloride plates are subjected in order to bring each of them to a metallic state or condition; and Fig. 10 is a diagrammatic view of a single electrolysis representing another mode of reducing the crystallized chloride plates to a metallic state.

Referring to the accompanying drawings, A is the furnace constructed of brick or other suitable material and of any suitable form.

B is a grate located and supported in the lower part of the furnace.

Beneath the grate B is an ash-pit C, closed from the outside of the furnace by means of a door $c$.

D is a draft-flue leading to the chimney D'.

E is an arch made of brick or other refractory material in the upper part of the furnace and supported in position by a metallic plate $e$ with a central opening therein. The annular plate $e$ is held in position by means of columns $f$, arranged and supported in the brick-work of the furnace in any suitable manner.

F is a porcelain crucible or melting-pot open at the top, and around the outer circumference thereof is formed a layer $d$ of amianthus, asbestus, or other suitable material, and between the layer $d$ and the metallic pot F' is a layer of sand $f'$ of any desired thickness. The metallic pot F' is pivotally supported in a central position within the furnace, and is operated from the outside by a lever $f^2$, attached to one of the journals of the metallic pot F', whereby the crucible F may be readily tilted for discharging the contents thereof into a receptacle for further treatment.

H is an inclined metallic hopper provided with a removable stopper $h$, by which arrangement the material may be readily charged into the crucible F.

I is a sliding door operated in any suitable manner to allow of the discharge of the molten mass or compound into a suitable mold for causing crystallization to take place.

Having described and pointed out the characteristic features of the melting or fusing furnace, I will now proceed to describe the first step in the process of producing a crystallized metallic lead plate of a given size— say from six to twelve inches square. I take for the base a charge of chloride of lead (Pb Cl$_2$) and to which I add five or six per cent., by weight, (more or less,) of ammonium chloride or other salts of ammonium. The ammonium chloride (NH$_4$Cl) or other salts of ammonium I prefer to add to the charge of chloride of lead during fusion, owing to the volatile nature of the ammonium chloride or other salts of ammonium, yet, nevertheless the ammonium chloride or other salts of ammonium may be added to the chloride of lead before fusing the mass or compound in the crucible F, if so desired. The proportion of ammonium chloride or other salts of ammonium added to the charge of chloride of lead may be varied, which in each case will depend upon the degree of porosity desired in the finished plate. I have found by practical experiments made that when great porosity is required the addition of a third chloride of a metal which is not of a deliquescent nature is advantageous—for instance, such as the chloride of cadmium or some other chloride or salt of a metal. When the third salt of the metal is added to the mass or compound, it will be necessary after crystallization has taken place to reduce the plate to a metallic state by a double electrolytic action, while with the use of ammonium chloride alone or other salts of ammonium alone in combination with the charge of chloride of lead to reduce the plate to a metallic state a single electrolysis is quite sufficient for obtaining as a product a crystallized metallic plate with the desired degree of porosity. When the charge of chloride of lead in excess having ammonium chloride or other salts of ammonium combined therewith has been subjected to fusion in the crucible F and the mass or compound has reached a liquid or molten state, the crucible is then tilted by means of the lever $f^2$ and the sliding door I at the same time raised sufficiently to permit of the discharge of the molten or liquid mass or compound into a mold M through the mouth $m$ thereof, and in a few minutes thereafter solidification will take place in the cooling off of the same therein and the plate cast or formed will become crystallized. In some instances it may be well to heat the mold M previous to charging the molten mass or compound into the same to a temperature of 150° centigrade, more or less, and still obtain good results in the crystallization of the chloride plate.

The selection of proper material for the mold M is of some considerable importance, and the interior surface thereof should be perfectly smooth. The mold to which I give preference is one made of either brass or bronze composed of two symmetrical sections $m'$ and $m^2$, chamfered as shown in Fig. 4, and the two sections united to each other by means of hinges $m^3$ and held together by means of catches or pawls $m^6$, secured to the extremities of the shaft $m^5$, held in bearings $m^7$, formed with one of the sections and operated by a lever $m^4$, as shown in Figs. 2 and 3. The two sections constituting the crystallizing-mold M may be formed so that each will be of a uniform thickness of metal, and the thickness of each section varying from two to five millimeters, according to the dimensions of the crystallized metallic plate to be obtained. This similarity and uniform thickness of each section is for some purposes advantageous, for the reason that crystallization therein commences from each side of the mold, and therefore if the two sections are of equal thickness the cooling-point of each will be attained at the same time, and the crystals formed in the solidified mass will meet in the middle, and thus the line of cleavage of the crystals will be the same throughout the entire crystallized plate in parallel columns. I have found that while it is preferable to have the two sections of the mold of equal thickness, yet at the same time it is not absolutely necessary; but when they are not of equal thickness of metal the cooling off of the material discharged into the same will be unequal, and as a consequence the line of meeting of the columns of crystals will be more to one side of the mold than to the other, which may be advantageous in some instances. When the plate crystallized has become solid in the hereinabove-described mold M, the two symmetrical sections $m'$ and $m^2$ thereof are unclamped and the plate removed into another mold N for casting around said crystallized plate a frame of lead or other suitable material. This bivalved framing-mold N consists of two sections $n^4$ and $n^5$, made of cast-iron or other suitable material. The section $n^4$ of the framing-mold N has an upper flange $n^6$ around the sides when in the form of a rectangular parallelopipedon, and with a beveled flange or rim $n^7$ on the four interior sides of the bottom. With the section $n^4$ is formed a funnel-shaped trough or neck $n^8$ for the introduction of material into the mold when the two sections $n^4$ and $n^5$ are clamped together by means of the pawls or catches $n^9$ and $n^{10}$, rigidly secured to each end of the shaft $n^{11}$, journaled in bearings $n^{12}$ and $n^{13}$, secured to the exterior surface of the section $n^5$ and operated by a lever $n^{14}$, which causes the pawls or catches $n^9$ and $n^{10}$ to engage with the strengthening-strip $n^{15}$, formed with or secured to the exterior surface of the section $n^4$. The section $n^5$ has an interior beveled rim $n^{16}$, corresponding with the beveled rim $n^7$ of the section $n^4$. The four sides or edges of the section $n^5$ are slightly deflected downward and a series of niches or semicircular grooves $n^{17}$ are formed in the under edges, forming air or vent holes when the two sections are clamped together.

In the section $n^5$, as shown in Fig. 7, two or more openings $n^{18}$ are formed at suitable distances apart for the introduction of small pins for holding the crystallized plates in proper position in the mold to allow lead or other suitable material to become cast uniformly around the plate in the form preferably of a beveled frame with a tongue or support $n^{19}$ for a contact in the reduction of the plates to a metallic state, to be presently described. A series of crystallized chloride plates, framed in the manner hereinabove described, are now placed in a glass canister or receptacle G, containing water and sulphuric acid—that is to say, with ten per cent. of sulphuric acid, more or less.

The manner of conducting the single electrolysis in two parts for reducing the crystallized chloride plates to a metallic state or condition, as clearly illustrated in Figs. 8 and 9, will now be briefly explained. The crystallized chloride plates numbered 2, 4, and 6, and the crystallized chloride plates numbered 1, 3, 5, and 7, as shown in Fig. 8, are placed in the canister G and insulated from each other by means of the rods $r$, made of rubber or other suitable material, and insulated from the canister G by means of the glass insulators $r'$, mounted on horizontal insulating-bars $r^2$, made of rubber or other material, and resting in the bottom of the canister G. The crystallized chloride plates 2, 4, and 6, insulated from the crystallized chloride plates 1, 3, 5, and 7 and from the glass canister G, are connected through their respective supports $n^{19}$ and the wire 10 with the negative electrode $s$ of the dynamo S, while the crystallized chloride plates 1, 3, 5, and 7 are connected through their supports $n^{19}$ and the wire 15 with the positive electrode $n$ of the dynamo S, and in consequence of the electrolysis which takes place the chlorine is driven out of these crystallized plates 2, 4, and 6 and against the other crystallized plates 1, 3, 5, and 7; but the chlorine immediately escapes into the open air, while at the same time the ammonium, which can only exist with another body, is decomposed, and the two gases of which it is composed—namely, azote (nitrogen) and hydrogen—will escape from said plates also into the open air, thereby leaving the crystallized plates 2, 4, and 6 in a metallic state or condition. By then reversing the wires 10 and 15 of the negative and positive electrodes of the dynamo S, as shown, for instance, in Fig. 9, so that the crystallized lead plates 1, 3, 5, and 7, through their supports $n^{19}$ and the wire 15, will be connected with the negative electrode $s$ of the dynamo S, and the crystallized metallic lead plates 2, 4, and 6, through their supports $n^{19}$ and the wire 10, will be connected with the positive electrode $n$ of the dynamo S, the electrolytic action which taking place will cause the chlorine to be driven out of the plates 1, 3, 5, and 7, and it will immediately escape into the open air, while at the same time the ammonium, together with the two gases of which it is composed—namely, azote (nitrogen) and hydrogen—will likewise escape into the air, thereby leaving the crystallized plates 1, 3, 5, and 7 in a metallic state or condition. The respective crystallized metallic lead plates having undergone the treatment hereinabove described may now be removed from the canister G and thoroughly washed and dried by means of heated air in any suitable manner, when said plates will be in perfect condition for use with the desired degree of porosity, while at the same time perfectly rigid for use as electrodes for electrical accumulators or storage-batteries.

In Fig. 10 I have illustrated another method of reducing the crystallized chloride plates to a metallic state or condition by a single electrolysis conducted by one operation in the following manner: The crystallized chloride plates 2, 4, and 6 are placed in a glass canister or receptacle $G^2$, containing water and ten per cent., more or less, of sulphuric acid with ordinary lead or charcoal plates 1, 3, 5, and 7, and the crystallized chloride plates 2, 4, and 6, insulated from the lead or charcoal plates 1, 3, 5, and 7 by means of vertical rods $r$, made of rubber or other suitable material, and insulated from the canister $G^2$ by means of glass insulators $r'$, mounted on horizontal insulating-bars $r^2$ in the bottom of the canister $G^2$, and these bars made of rubber or other suitable insulating material. The crystallized chloride plates 2, 4, and 6, insulated from the ordinary lead or charcoal plates 1, 3, 5, and 7 and from the canister $G^2$, are connected through their supports $n^{19}$ and the wire 10 with the negative electrode $s$ of the dynamo S, while the ordinary lead or charcoal plates 1, 3, 5, and 7 are connected through their tongues or supports $n^{19}$ and the wire 15 with the positive electrode $n$ of the dynamo S, and in consequence of the electrolysis which takes place the crystallized plates 2, 4, and 6 will be readily reduced to a metallic state or condition and the chlorine eliminated by the operation will be driven against the lead or charcoal plates, while at the same time the ammonium will be decomposed into the two gases, azote (nitrogen) and hydrogen, which will escape into the open air, thereby leaving the crystallized plates 2, 4, and 6 in a metallic state or condition. These crystallized metallic lead plates 2, 4, and 6 may then be removed from the glass canister or receptacle $G^2$ and thoroughly washed and then dried by means of heated air in any suitable manner, when said crystallized metallic lead plates with the desired degree of porosity will be in perfect condition for use.

Having thus described the nature and objects of my invention, what I claim as new, and desire to secure by Letters Patent, is—

1. The method of producing a porous crystallized lead plate or other structure, which consists in subjecting a salt of lead and an ammonium salt to fusion, then pouring the fused mass into a mold and allowing it to crystallize therein, and then reducing the structure to a metallic state, substantially as and for the purposes set forth.

2. The method of producing a porous crystallized metal lead structure, which consists in subjecting chloride of lead and an ammonium salt to fusion, then pouring the fused mass into a mold and allowing it to cool and crystallize therein, and then reducing electrolytically the structure to a metallic state, substantially as and for the purposes set forth.

In witness whereof I have hereunto set my hand in the presence of two subscribing witnesses.

CLÉMENT PAYEN.

Witnesses:
THOMAS M. SMITH,
GEO. W. REED.